(12) United States Patent
Sorensen

(10) Patent No.: US 8,891,785 B2
(45) Date of Patent: Nov. 18, 2014

(54) PROCESSING SIGNALS

(75) Inventor: Karsten Vandborg Sorensen, Stockholm (SE)

(73) Assignee: Skype, Dublin (IE)

( * ) Notice: Subject to any disclaimer, the term of this patent is extended or adjusted under 35 U.S.C. 154(b) by 415 days.

(21) Appl. No.: 13/308,106

(22) Filed: Nov. 30, 2011

(65) Prior Publication Data

US 2013/0083832 A1    Apr. 4, 2013

(30) Foreign Application Priority Data

Sep. 30, 2011    (GB) .................................. 1116843.2

(51) Int. Cl.
| | |
|---|---|
| *H04R 3/00* | (2006.01) |
| *G10L 21/0208* | (2013.01) |
| *G01S 3/14* | (2006.01) |
| *G01S 3/805* | (2006.01) |
| *G01S 3/86* | (2006.01) |
| *G10L 21/0216* | (2013.01) |
| *H04R 1/40* | (2006.01) |

(52) U.S. Cl.
CPC ............... *G10L 21/0208* (2013.01); *G01S 3/14* (2013.01); *G10L 2021/02166* (2013.01); *G01S 3/805* (2013.01); *H04R 1/406* (2013.01); *H04R 3/005* (2013.01); *G01S 3/86* (2013.01); *H04R 2499/11* (2013.01)
USPC .............. 381/92; 381/58; 381/94.1; 704/233; 367/118

(58) Field of Classification Search
USPC ............ 381/80, 91, 92, 66, 58, 94.1, 122, 61, 381/356, 357; 704/226, 208, 233, 234, 261, 704/268; 700/94; 367/118, 119, 123–127, 367/129
See application file for complete search history.

(56) References Cited

U.S. PATENT DOCUMENTS

| | | | |
|---|---|---|---|
| 4,849,764 A | 7/1989 | van Heyningen | |
| 5,524,059 A | 6/1996 | Zurcher | |

(Continued)

FOREIGN PATENT DOCUMENTS

| | | |
|---|---|---|
| CA | 2413217 | 5/2004 |
| CN | 100446530 | 3/2001 |

(Continued)

OTHER PUBLICATIONS

Search Report, GB Application No. 1108885.3, (Sep. 3, 2012), 3 pages.

(Continued)

*Primary Examiner* — Vivian Chin
*Assistant Examiner* — Friedrich W Fahnert
(74) *Attorney, Agent, or Firm* — Sonia Cooper; Jim Ross; Micky Minhas

(57) ABSTRACT

Signals are received, over a range of angles, at an input of a device. The signals include a primary signal with a principal direction of arrival and an interfering signal with a respective interfering direction of arrival at the input. Measurements are determined for the received signals over the range of angles. Each measurement relates to a particular angle and indicating the energy of the received signals which are received from the particular angle. For each angle over the range of angles, a value is removed from the measurement for that angle, the value being based on the minimum of: (i) the energy of the measurement for that angle, and (ii) the energy of a corresponding measurement for a corresponding angle mirrored around the principal direction of arrival, whereby the remaining values of the plurality of measurements are indicative of said at least one interfering direction of arrival.

22 Claims, 7 Drawing Sheets

(56) References Cited

U.S. PATENT DOCUMENTS

| | | | |
|---|---|---|---|
| 6,157,403 | A | 12/2000 | Nagata |
| 6,232,918 | B1 | 5/2001 | Wax et al. |
| 6,339,758 | B1 | 1/2002 | Kanazawa et al. |
| 6,914,854 | B1 | 7/2005 | Heberley et al. |
| 8,249,862 | B1 | 8/2012 | Cheng et al. |
| 8,325,952 | B2 * | 12/2012 | Cho .............................. 381/300 |
| 8,401,178 | B2 | 3/2013 | Chen et al. |
| 2002/0103619 | A1 | 8/2002 | Bizjak |
| 2002/0171580 | A1 | 11/2002 | Gaus et al. |
| 2004/0213419 | A1 | 10/2004 | Varma et al. |
| 2005/0149339 | A1 | 7/2005 | Tanaka et al. |
| 2005/0216258 | A1 | 9/2005 | Kobayashi et al. |
| 2005/0232441 | A1 | 10/2005 | Beaucoup et al. |
| 2006/0015331 | A1 | 1/2006 | Hui et al. |
| 2006/0133622 | A1 | 6/2006 | Chen |
| 2006/0269073 | A1 | 11/2006 | Mao |
| 2008/0039146 | A1 | 2/2008 | Jin |
| 2008/0199025 | A1 | 8/2008 | Amada |
| 2008/0232607 | A1 | 9/2008 | Tashev et al. |
| 2008/0260175 | A1 | 10/2008 | Elko |
| 2009/0010453 | A1 | 1/2009 | Zurek et al. |
| 2009/0076810 | A1 | 3/2009 | Matsuo |
| 2009/0076815 | A1 * | 3/2009 | Ichikawa et al. ............... 704/233 |
| 2009/0125305 | A1 | 5/2009 | Cho |
| 2009/0274318 | A1 | 11/2009 | Ishibashi et al. |
| 2009/0304211 | A1 | 12/2009 | Tashev et al. |
| 2010/0027810 | A1 | 2/2010 | Marton |
| 2010/0070274 | A1 | 3/2010 | Cho et al. |
| 2010/0081487 | A1 | 4/2010 | Chen et al. |
| 2010/0128892 | A1 | 5/2010 | Chen et al. |
| 2010/0150364 | A1 | 6/2010 | Buck et al. |
| 2010/0177908 | A1 | 7/2010 | Seltzer et al. |
| 2010/0215184 | A1 | 8/2010 | Buck et al. |
| 2010/0217590 | A1 | 8/2010 | Nemer et al. |
| 2010/0246844 | A1 | 9/2010 | Wolff |
| 2010/0296665 | A1 | 11/2010 | Ishikawa et al. |
| 2010/0315905 | A1 | 12/2010 | Lee et al. |
| 2010/0323652 | A1 | 12/2010 | Visser et al. |
| 2011/0038486 | A1 | 2/2011 | Beaucoup |
| 2011/0038489 | A1 | 2/2011 | Visser et al. |
| 2011/0054891 | A1 | 3/2011 | Vitte et al. |
| 2011/0070926 | A1 | 3/2011 | Vitte et al. |
| 2011/0158418 | A1 | 6/2011 | Bai et al. |
| 2011/0178798 | A1 | 7/2011 | Flaks et al. |
| 2012/0182429 | A1 | 7/2012 | Forutanpour et al. |
| 2012/0303363 | A1 | 11/2012 | Sorensen |
| 2013/0013303 | A1 | 1/2013 | Strommer et al. |
| 2013/0034241 | A1 | 2/2013 | Pandey et al. |
| 2013/0082875 | A1 | 4/2013 | Sorensen |
| 2013/0083934 | A1 | 4/2013 | Åhgren |
| 2013/0083936 | A1 | 4/2013 | Sorensen |
| 2013/0083942 | A1 | 4/2013 | Åhgren |
| 2013/0083943 | A1 | 4/2013 | Sorensen |
| 2013/0129100 | A1 | 5/2013 | Sorensen |
| 2013/0136274 | A1 | 5/2013 | Åhgren |
| 2013/0148821 | A1 | 6/2013 | Sorensen |

FOREIGN PATENT DOCUMENTS

| | | |
|---|---|---|
| CN | 1809105 | 7/2006 |
| CN | 1885848 | 12/2006 |
| CN | 101015001 | 8/2007 |
| CN | 101207663 | 6/2008 |
| CN | 100407594 | 7/2008 |
| CN | 101667426 | 3/2010 |
| CN | 102131136 | 7/2011 |
| CN | 1540903 | 10/2014 |
| DE | 19943872 | 3/2001 |
| EP | 0002222 | 6/1979 |
| EP | 0654915 | 5/1995 |
| EP | 1722545 | 11/2006 |
| EP | 1919251 | 5/2008 |
| EP | 2026329 | 2/2009 |
| EP | 2159791 | 3/2010 |
| EP | 2197219 | 6/2010 |
| EP | 2222091 | 8/2010 |
| EP | 2339574 | 6/2011 |
| JP | 2006109340 | 4/2006 |
| JP | 2006319448 | 11/2006 |
| JP | 2006333069 | 12/2006 |
| JP | 2010232717 | 10/2010 |
| WO | WO-0018099 | 3/2000 |
| WO | WO-03010996 | 2/2003 |
| WO | WO-2007127182 | 11/2007 |
| WO | WO-2008041878 | 4/2008 |
| WO | WO-2010098546 | 9/2010 |
| WO | WO-2012097314 | 7/2012 |

OTHER PUBLICATIONS

Search Report, GB Application No. 1111474.1, (Oct. 24, 2012), 3 pages.
Search Report, GB Application No. 1116847.3, (Dec. 20, 2012), 3 pages.
Foreign Office Action, CN Application No. 201210368101.5, Dec. 6, 2013, 9 pages.
Non-Final Office Action, U.S. Appl. No. 13/307,852, Feb. 20, 2014, 5 pages.
Non-Final Office Action, U.S. Appl. No. 13/307,994, Dec. 19, 2013, 12 pages.
Non-Final Office Action, U.S. Appl. No. 13/341,610, Dec. 27, 2013, 10 pages.
Search Report, GB Application No. 1119932.0, Feb. 28, 2013, 8 pages.
Search Report, Application No. GB1116846.5, Jan. 28, 2013, 3 pages.
Search Report, GB Application No. 1116840.8, Jan. 29, 2013, 3 pages.
Search Report, GB Application No. 1116843.2, Jan. 30, 2013, 3 pages.
Search Report, GB Application No. 1116869.7, Feb. 7, 2013, 3 pages.
Search Report, GB Application No. 1121147.1, Feb. 14, 2013, 5 pages.
UK Search Report, UK Application No. GB1116848.1, Dec. 18, 2012, 3 pages.
Foreign Office Action, CN Application No. 201210377130.8, Jan. 15, 2014, 12 pages.
International Search Report and Written Opinion, Application No. PCT/EP2012/059937, Feb. 14, 2014, 9 pages.
Non-Final Office Action, U.S. Appl. No. 13/327,308, Mar. 28, 2014, 13 pages.
Notice of Allowance, U.S. Appl. No. 13/307,994, Apr. 1, 2014, 7 pages.
PCT Search Report and Written Opinion, Application No. PCT/US2012/068649, (Mar. 7, 2013), 9 pages.
PCT Search Report and Written Opinion, Application No. PCT/US2012/058148, (May 3, 2013), 9 pages.
PCT Search Report and Written Opinion, Application No. PCT/US2012/058147, (May 8, 2013), 9 pages.
PCT Search Report and Written Opinion, Application No. PCT/US2012/058143, (Dec. 21, 2012), 12 pages.
Goldberg, et al., "Joint Direction-of-Arrival and Array Shape Tracking for Multiple Moving Targets", *IEEE International Conference on Acoustics, Speech, and Signal Processing*, (Apr. 21, 1997), pp. 511-514.
Handzel, et al., "Biomimetic Sound-Source Localization", *IEEE Sensors Journal*, vol. 2, No. 6, (Dec. 2002), pp. 607-616.
Kellerman, W. "Strategies for Combining Acoustic Echo Cancellation and Adaptive Beamforming Microphones Arrays", In *Proceedings of ICASSP 1997*, (Apr. 1997), pp. 219-222.
PCT Search Report and Written Opinion, Application No. PCT/US2012/058146, (Jan. 21, 2013),9 pages.
PCT Search Report and Written Opinion, Application No. PCT/US2012/066485, (Feb. 15, 2013),12 pages.
PCT Search Report and Written Opinion, Application No. PCT/US2012/2065737, (Feb. 13, 2013),12 pages.
PCT Search Report and Writen Opinion, Application No. PCT/US2012/058145, (Apr. 24, 2013),18 pages.

(56) References Cited

OTHER PUBLICATIONS

PCT Search Report and Written Opinion, Application No. PCT/US2012/045556, (Jan. 2, 2013),10 pages.
Grbic, Nedelko et al., "Soft Constrained Subband Beamforming for Hands-Free Speech Enhancement", In *Proceedings of ICASSP 2002*, (May 13, 2002),4 pages.
International Search Report and Written Opinion, Application No. PCT/US2013/058144, (Sep. 11, 2013), 10 pages.
Non-Final Office Action, U.S. Appl. No. 13/212,633, (Nov. 1, 2013), 14 pages.
Non-Final Office Action, U.S. Appl. No. 13/212,688, (Nov. 7, 2013), 14 pages.
Knapp, et al., "The Generalized Correlation Method for Estimation of Time Delay", *IEEE Transactions on Acoustics, Speech, and Signal Processing*, vol. ASSP-24, No. 4, (Aug. 1976), pp. 320-327.
"Corrected Notice of Allowance", U.S. Appl. No. 13/307,994, Jun. 24, 2014, 2 pages.
"Final Office Action", U.S. Appl. No. 13/212,633, May 23, 2014, 16 pages.
"Final Office Action", U.S. Appl. No. 13/212,688, Jun. 5, 2014, 20 pages.
"Final Office Action", U.S. Appl. No. 13/341,610, Jul. 17, 2014, 7 pages.
"Foreign Office Action", CN Application No. 201210368224.9, Jun. 5, 2014, 11 pages.
"Non-Final Office Action", U.S. Appl. No. 13/307,852, May 16, 2014, 4 pages.
"Non-Final Office Action", U.S. Appl. No. 13/308,165, Jul. 17, 2014, 14 pages.
"Supplemental Notice of Allowance", U.S. Appl. No. 13/307,994, Aug. 8, 2014, 2 pages.

\* cited by examiner

PROCESSING SIGNALS

RELATED APPLICATION

This application claims priority under 35 U.S.C. §119 or 365 to Great Britain, Application No. GB 1116843.2, filed Sep. 30, 2011. The entire teachings of the above application are incorporated herein by reference.

TECHNICAL FIELD

The present invention relates to processing signals received at a device.

BACKGROUND

A device may have input means that can be used to receive transmitted signals from the surrounding environment. For example, a device may have audio input means such as a microphone that can be used to receive audio signals from the surrounding environment. For example, a microphone of a user device may receive a primary audio signal (such as speech from a user) as well as other audio signals. The other audio signals may be interfering audio signals received at the microphone of the device, and may be received from an interfering source or may be ambient background noise or microphone self-noise. The interfering audio signals may disturb the primary audio signals received at the device. The device may use the received audio signals for many different purposes. For example, where the received audio signals are speech signals received from a user, the speech signals may be processed by the device for use in a communication event, e.g. by transmitting the speech signals over a network to another device which may be associated with another user of the communication event. Alternatively, or additionally, the received audio signals could be used for other purposes, as is known in the art.

In other examples, a device may have receiving means for receiving other types of transmitted signals, such as general broadband signals, general narrowband signals, radar signals, sonar signals, antenna signals, radio waves or microwaves. The same situations can occur for these other types of transmitted signals whereby a primary signal is received as well as interfering signals at the receiving means. The description below is provided mainly in relation to the receipt of audio signals at a device, but the same principles will apply for the receipt of other types of transmitted signals at a device, such as general broadband signals, general narrowband signals, radar signals, sonar signals, antenna signals, radio waves and microwaves as described above.

In order to improve the quality of the received audio signals, (e.g. the speech signals received from a user for use in a call), it is desirable to suppress interfering audio signals (e.g. background noise and interfering audio signals received from interfering audio sources) that are received at the microphone of the user device.

The use of stereo microphones and other microphone arrays in which a plurality of microphones operate as a single audio input means is becoming more common. The use of a plurality of microphones at a device enables the use of extracted spatial information from the received audio signals in addition to information that can be extracted from an audio signal received by a single microphone. When using such devices one approach for suppressing interfering audio signals is to apply a beamformer to the audio signals received by the plurality of microphones. Beamforming is a process of focussing the audio signals received by a microphone array by applying signal processing to enhance particular audio signals received at the microphone array from one or more desired directions. For simplicity we will describe the case with only a single desired direction herein, but the same method will apply when there are more directions of interest. The angle from which the desired audio signal is received at the microphone array, so-called Direction of Arrival ("DOA") information can be determined or set prior to the beamforming process. It can be advantageous to set the desired direction of arrival to be fixed since the estimation of the direction of arrival may be complex. However, in alternative situations it can be advantageous to adapt the desired direction of arrival to changing conditions, and so it may be advantageous to perform the estimation of the desired direction of arrival in real-time as the beamformer is used. Adaptive beamformers apply beamformer coefficients to the received audio signals whereby they use the DOA information to process the audio signals received by the plurality of microphones to form a "beam" whereby a high gain is applied in a direction from which the desired audio signal is received by the microphones and a low gain is applied in the direction of any interfering sources.

While the beamformer will attempt to suppress the unwanted audio signals coming from unwanted directions, the number of microphones as well as the shape and the size of the microphone array will limit the effect of the beamformer, and as a result the unwanted audio signals are suppressed, but may remain audible. The output of the beamformer can be further processed in the device in the same way as a received audio signal from a single microphone may be processed, e.g. for transmission to another device as part of a communication event. For example, the output of the beamformer may be supplied as an input signal to at least one of an echo cancellation stage, an Automatic Gain Control (AGC) processing stage and a single channel noise reduction stage in the device.

It may be useful to determine particular directions of arrival at the microphones relating to particular interfering audio signals coming from particular interference sources. It may then be beneficial to adapt the beamformer coefficients of the beamformer to apply a greater level of suppression to audio signals which are received from a particular direction of known interference (i.e. an interfering direction of arrival). In this way, the interference of the primary (or "desired") audio signal can be reduced.

The directions of arrival for sources of interference may be determined by calculating the cross-covariance between the input audio signals to determine the direction of arrival for the audio signals. The cross-covariance indicates the direction of arrival for which the audio signals received at the plurality of microphones are most highly correlated.

SUMMARY

The inventor has realized that with the cross-covariance methods of the prior art, where there are a plurality of audio signals being received at the microphones, for audio signals that have a weak power when they are received, the calculation of the cross-covariance can be dominated by the stronger signals and therefore may not successfully calculate the direction of arrival of the weak audio signal. For example, when the primary speaker (that is, the source of desired audio signals) is active at the same time that audio signals from interfering sources are received at the microphones then the cross-covariance methods will be dominated by this signal and the imperfections in the microphone array, as the power of the main speaker dominates the cross-covariance estimation. The inventor has further realized that some types of interfering audio signals may only occur when the source of the desired audio signals is active. For example, where the interfering audio signal is speech reverberance from a main speaker then this interfering audio signal by definition only occurs when the speaker is active, and in this case the cross-covariance method for calculating the direction of arrival of the speech reverberance performs poorly because the primary audio signals from the main speaker dominate the power of the audio signals received at the microphones.

Embodiments of the present invention provide for a method and device for determining the interfering direction of arrival of interfering audio signals at a device which does not use the cross-covariance method of the prior art described above and which can indicate the interfering direction of an interfering audio signal even when the power of the primary audio signal is greater than the power of the interfering audio signal received at the device.

According to a first aspect of the invention there is provided a method of processing signals at a device, the method comprising: receiving signals, over a range of angles, at an input of the device, the signals including a primary signal received with a principal direction of arrival at the input and at least one interfering signal received with a respective at least one interfering direction of arrival at the input; determining a plurality of measurements for the received signals over the range of angles, each measurement relating to a particular angle and indicating the energy of the received signals which are received from the particular angle; and for each angle over the range of angles, removing from the measurement for that angle a value based on the minimum of: (i) the measurement for that angle, and (ii) a corresponding measurement for a corresponding angle mirrored around the principal direction of arrival, whereby the remaining values of the plurality of measurements are indicative of said at least one interfering direction of arrival.

The measurements provide an indication of the energy of the received signals in particular directions. Therefore the measurements can be used to indicate directions from which more energy is being received at the device than from other directions. In preferred embodiments, the step of determining a plurality of measurements comprises determining a range of beamformer output energies of beamforming means applied to the received signals when steered over the range of angles, and the step of removing a value from the measurement for each angle over the range of angles comprises removing from the beamformer output energy for that angle a value based on the minimum of: (i) the energy of the beamformer output for that angle, and (ii) the energy of a corresponding beamformer output for a corresponding angle mirrored around the principal direction of arrival, whereby the remaining values of the plurality of beamformer outputs are indicative of said at least one interfering direction of arrival. In other embodiments, other measurements (than beamformer output energies) may be used to indicate the energy being received at the device from different directions. For example, the measurements may be correlation measurements indicating the correlation of the received signals as a function of angle of arrival of the received signals.

In preferred embodiments the signals are audio signals, but in other embodiments the signals may be other types of transmitted signals, such as general broadband signals, general narrowband signals, radar signals, sonar signals, antenna signals, radio waves or microwaves.

The inventor has realized that if there were no interfering signals, i.e. in a theoretical environment with an infinite Signal to Noise Ratio (SNR), then the primary signals received from a desired source direction would first be received by the input means, and after determining the plurality of beamformer outputs, the energy of the beamformer outputs would be spread out symmetrically around the principal direction of arrival, provided that the applied beamformers have a symmetrical beampattern. This would happen partly due to microphone imperfections, and more importantly due to beamformer assumptions of the input signal arriving as a plane wave, and because the beamforming means would not apply full attenuation in other directions than what they are steered towards. Particularly, the width of the main lobe would cause neighboring angles to an interfering source to also indicate interference due to that interfering source. The desired signal source would therefore be present in the plurality of beamformer output energies symmetrically. Asymmetries in plurality of beamformer output energies of the signals received at the input means of the device are indicative of interfering signals which are received from a particular direction away from the principal direction of arrival of the primary signals. Advantageously, preferred embodiments of the invention remove the symmetric contribution from the beamformer output energies such that the remaining values emphasize the asymmetries in the signals received at the device. This emphasizes the interfering direction(s) of arrival of the interfering signal(s). After removing the symmetric contribution from the beamformer output energies, the remaining values in the beamformer output energies are high for directions from which interfering signals are received.

Embodiments of the present invention are valid for use both in situations when the primary signal is dominating the received signals (i.e. when the primary signal has the highest power of the received signals) and in situations when the primary signal is not dominating the received signals (i.e. when the primary signal does not have the highest power of the received signals). This is because the primary signal will provide a symmetric contribution to the beamformer output energies and is therefore removed according to the method of embodiments of the present invention, such that the values of the remaining beamformer outputs include only the interfering signals. However, the prior art systems using cross-covariance methods perform particularly poorly when the primary signal is dominating the received signals. Therefore embodiments of the present invention are particularly useful for indicating the interfering directions of arrival when the primary signal is dominating the received signals.

According to a second aspect of the invention there is provided a device for processing signals, the device comprising: an input for receiving signals over a range of angles, the signals including a primary signal received with a principal direction of arrival at the input and at least one interfering signal received with a respective at least one interfering direction of arrival at the input; means for determining a plurality of measurements for the received signals over the range of angles, each measurement relating to a particular angle and indicating the energy of the received signals which are received from the particular angle; and means for removing, for each angle over the range of angles, from the measurement for that angle a value based on the minimum of: (i) the measurement for that angle, and (ii) a corresponding measurement for a corresponding angle mirrored around the principal direction of arrival, whereby the remaining values of the plurality of measurements are indicative of said at least one interfering direction of arrival.

According to a third aspect of the invention there is provided a computer program product for processing signals received over a range of angles, at an input of a device, the signals including a primary signal received with a principal direction of arrival at the input and at least one interfering signal received with a respective at least one interfering direction of arrival at the input, the computer program product being embodied on a non-transient computer-readable medium and configured so as when executed on a processor of the device to perform the steps of: determining a plurality of measurements for the received signals over the range of angles, each measurement relating to a particular angle and indicating the energy of the received signals which are received from the particular angle; and for each angle over the range of angles, removing from the measurement for that angle a value based on the minimum of: (i) the measurement for that angle, and (ii) a corresponding measurement for a corresponding angle mirrored around the principal direction of arrival, whereby the remaining values of the plurality of measurements are indicative of said at least one interfering direction of arrival.

In preferred embodiments, the method further comprising suppressing the signals received with the at least one interfering direction of arrival as indicated by said remaining values of the measurements. The method may further comprise determining the principal direction of arrival by analyzing the received signals. The method may further comprise setting the range of angles such that the principal direction of arrival is in the middle of the range of angles.

In preferred embodiments, the input comprises a plurality of sensors (e.g. microphones) for receiving the signals (e.g. audio signals), and the method further comprises using a primary beamformer to apply beamformer coefficients to the received signals thereby applying greater levels of suppression to signals received with the at least one interfering direction of arrival than to signals received with the principal direction of arrival.

In some embodiments the removing step is performed in dependence upon a determination that the primary signal has the highest power of the received signals. The device may be a television or a computer. The beamforming means for calculating the output energies from a plurality of angles may comprise a delay-and-add beamformer and the primary beamformer subsequently used to suppress the interfering sources may comprise a Minimum Variance Distortionless Response beamformer.

BRIEF DESCRIPTION OF THE DRAWINGS

For a better understanding of the present invention and to show how the same may be put into effect, reference will now be made, by way of example, to the following drawings in which.

DETAILED DESCRIPTION

Preferred embodiments of the invention will now be described by way of example only.

In the following embodiments of the invention, techniques are described in which interfering directions of arrival of respective interfering signals are indicated. The coefficients of a beamformer can be adapted taking into account the indicated interfering directions of arrival to thereby suppress the interfering signals. The embodiments described below relate to the case where the signals are audio signals. However, other embodiments relate to cases where the signals are other types of transmitted signals, such as general broadband signals, general narrowband signals, radar signals, sonar signals, antenna signals, radio waves or microwaves. The techniques work particularly well when the interfering audio signals are received with a lower power than the primary (or "desired") audio signal. A technique to determine the direction of arrival of an audio signal is to use a delay-and-add beamformer in a number of different directions and choose the direction with most energy in the output as the direction of the most active source. This method can be combined with a voice activity detector to find the direction of a desired speaker towards which the beamformer could be pre-steered.

Figure 1:
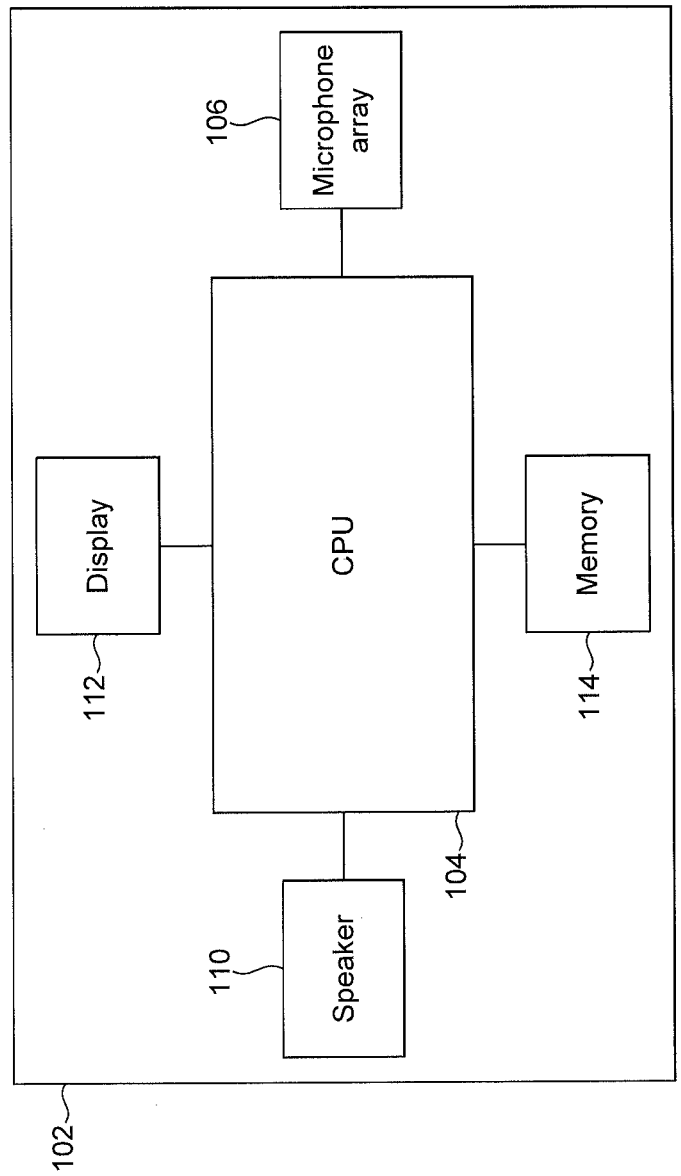
FIG. 1 shows a schematic view of a device according to a preferred embodiment.

Reference is first made to FIG. 1 which illustrates a schematic view of a device 102. The device 102 may be a fixed or a mobile device. The device 102 comprises a CPU 104, to which is connected a microphone array 106 for receiving audio signals, a speaker 110 for outputting audio signals, a display 112 such as a screen for outputting visual data to a user of the device 102 and a memory 114 for storing data.

Figure 2:
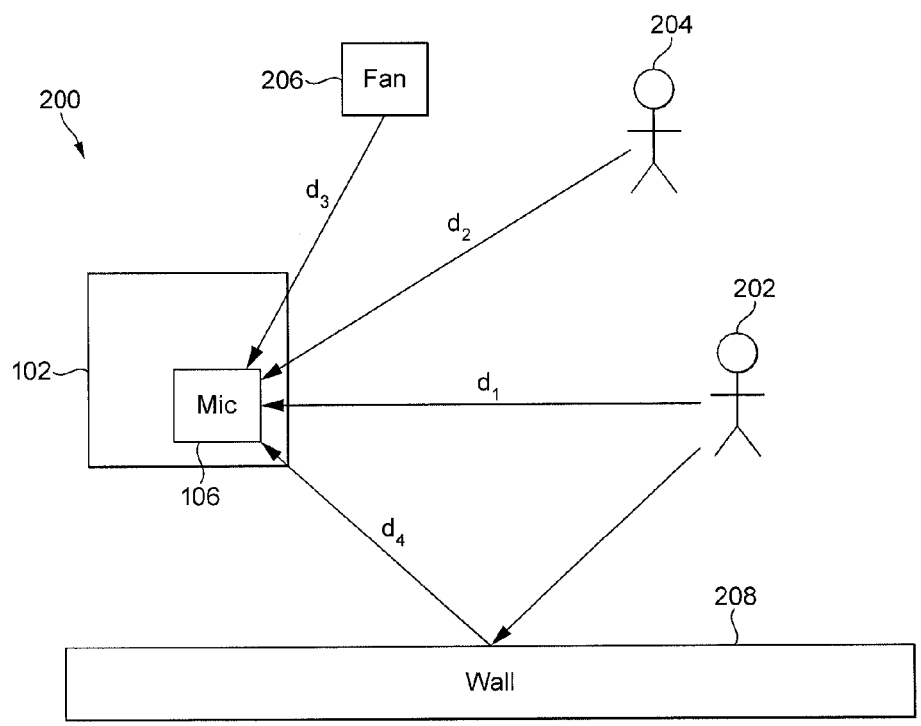
FIG. 2 shows a system according to a preferred embodiment.

Reference is now made to FIG. 2, which illustrates an example environment 200 in which the device 102 operates.

The microphone array 106 of the device 102 receives audio signals from the environment 200. For example, as shown in FIG. 2, the microphone array 106 receives audio signals from a user 202 (as denoted $d_1$ in FIG. 2), audio signals from another user 204 (as denoted $d_2$ in FIG. 2), audio signals from a fan 206 (as denoted $d_3$ in FIG. 2) and audio signals from the user 202 reflected off a wall 208 (as denoted $d_4$ in FIG. 2). It will be apparent to a person skilled in the art that the microphone array 106 may receive other audio signals than those shown in FIG. 2, such as for example microphone self-noise. In the scenario shown in FIG. 2 the audio signal arriving directly from the user 202 is the desired audio signal, and all the other audio signals which are received at the microphone array 106 are interfering audio signals. The signal that is reflected from the wall when the user 202 is speaking adds reverberance to the signal as recorded by the microphone array 106. In other embodiments more than one of the audio signals received at the microphone array 106 may be considered "desired" audio signals, but for simplicity, in the embodiments described herein there is only one desired audio signal (that being the audio signal from user 202) and the other audio signals are considered to be interference. FIG. 2 shows interference sources being another user 204, a fan 206 or a reflection from a wall 208. Other sources of unwanted noise signals may include for example air-conditioning systems, and a device playing music.

The desired audio signal(s) is(are) identified when the audio signals are processed after having been received at the microphone array 106. During processing, desired audio signals are identified based on the detection of speech like characteristics, and a principal direction of a main speaker is determined. FIG. 2 shows the main speaker (user 202) as the source of the desired audio signal that arrives at the microphone array 106 from the principal direction $d_1$.

Figure 3:
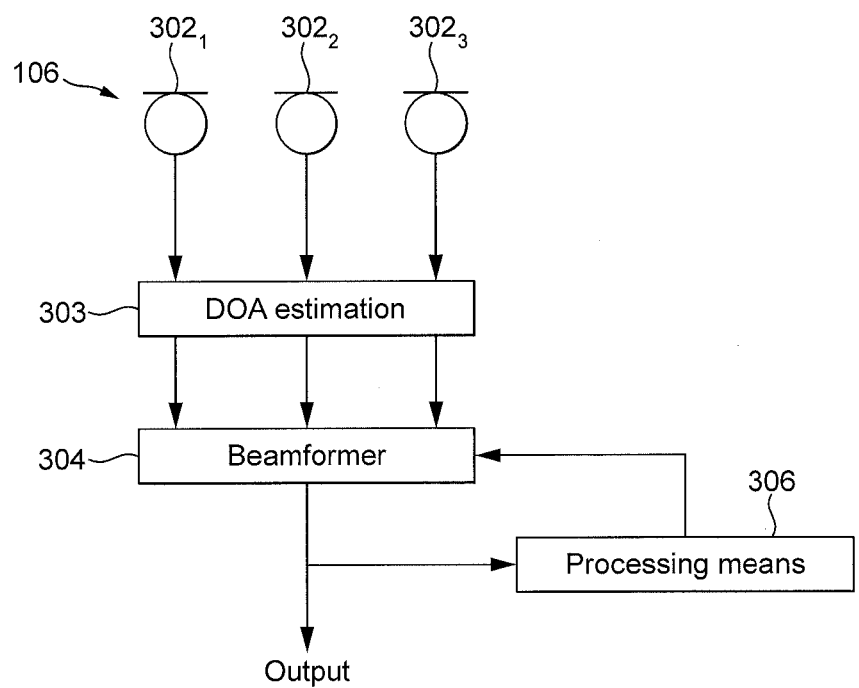
FIG. 3 shows a functional block diagram of elements of a device according to a preferred embodiment.

Reference is now made to FIG. 3 which illustrates a functional representation of elements of the device 102. The microphone array 106 comprises a plurality of microphones $302_1$, $302_2$ and $302_3$. The device 102 further comprises a Direction of Arrival (DOA) Estimation block 303, beamformer 304 and processing means 306. The DOA estimation block 303, beamformer 304 and the processing means 306 may be implemented in software executed on the CPU 104 or implemented in hardware in the device 102. The output of each microphone in the microphone array 106 is coupled to a respective input of the DOA estimation block 303. The outputs from the microphone are passed from the DOA estimation block 303 to the beamformer 304. Persons skilled in the art will appreciate that multiple inputs are needed in order to implement beamforming. The microphone array 106 is shown in FIG. 3 as having three microphones ($302_1$, $302_2$ and $302_3$), but it will be understood that this number of microphones is merely an example and is not limiting in any way.

The DOA estimation block 303 and the beamformer 304 include means for receiving and processing the audio signals from the microphones of the microphone array 106. For example, the DOA estimation block 303 may comprise a voice activity detector (VAD). In operation the beamformer 304 ascertains the nature of the audio signals received by the microphone array 106 and based on detection of speech like qualities detected by the VAD and the DOA estimation block 303, one or more principal direction(s) of the main speaker(s) is determined. In other embodiments the principal direction(s) of the main speaker(s) may be pre-set for use by the beamformer 304 such that the beamformer 304 focuses on fixed directions. In the example shown in FIG. 2 the direction of audio signals ($d_1$) received from the user 202 is determined to be the principal direction. The beamformer 304 uses the DOA information to process the audio signals by forming a beam that has a high gain in the principal direction ($d_1$) from which wanted signals are received at the microphone array 106 and a low gain in the direction of interfering sources. If the beamformer 304 has knowledge of the interfering directions of arrival ($d_2$, $d_3$ and $d_4$) then particularly low gains can be applied to audio signals received from those interfering directions of arrival in order to better suppress the interfering audio signals. Whilst it has been described above that the beamformer 304 can determine any number of principal directions, the number of principal directions determined affects the properties of the beamformer e.g. for a large number of principal directions the beamformer 304 will be able to apply less attenuation of the signals received at the microphone array from the other (unwanted) directions than if only a single principal direction is determined. The output of the beamformer 304 is provided to further processing means of the device 102 in the form of a single channel to be processed. It is also possible to output more than one channel, for example to preserve or to virtually generate a stereo image. The output of the beamformer 304 may be used in many different ways in the device 102 as will be apparent to a person skilled in the art. For example, the output of the beamformer 304 could be used as part of a communication event in which the user 202 is participating using the device 102.

The output of the beamformer 304 may be subject to further signal processing (such as automatic gain control, noise suppression, and/or echo cancelling). The details of such further signal processing is beyond the scope of this invention and so the details of the further signal processing are not given herein, but a skilled person would be aware of ways in which the output of the beamformer 304 may be processed in the device 102.

The output of the beamformer 304 is passed to the processing means 306. The processing means 306 can analyze the output from the beamformer 304 and can control the beamformer 304 to thereby adapt the beamformer coefficients that are applied by the beamformer 304 to the audio signals received from the microphones $302_1$, $302_2$ and $302_3$ of the microphone array 106.

If there is no interference present in the environment 200 such that the only audio signals received by the microphone array 106 are the desired audio signal from the user 202 then the energy distribution of the audio signals received at the microphone array 106 would be symmetric over a range of angles centered at the direction of the desired signal. Therefore, with no interference, the energy of an audio signal which is created in the principal direction would, when received with a particular angle relative to the principal direction of the desired speaker, be equal to the energy of a corresponding audio signal having a corresponding angle but on an opposite side of the principal direction of the desired speaker (i.e. an angle mirrored around the principal direction of arrival). This means that, with no interference, the output of a delay-and-add beamformer would have the same energy in a particular angle and in the mirrored angle due to the perfect symmetry of the input audio signal and the applied beamformer. This means that the spatial energy distribution of the outputs of the beamformer 304 over a range of angles would be symmetric around the principal direction of arrival if there were no interfering sources at all.

In embodiments of the present invention the spatially symmetric contribution to beamformer output energies over the range of angles is removed by subtracting from the beamformer output energies, at all angles, the minimum of the energy from the angle itself and the one mirrored around the principal direction of the desired speaker. The lack of perfect symmetry that you commonly see in any environment (e.g. environment 200) is exploited to determine the direction of interfering audio signals. Advantageously, the values of the remaining beamformer output energies after the subtraction clearly identify the directions of the interfering audio signals received at the microphone array 106. For example, the interfering audio signals may be reflections (such as the reflection of the wall 208, denoted $d_4$ in FIG. 2) which cause reverberance or may be any other interfering audio signals from other noise sources (e.g. user 204 and fan 206) which are spatially separated from the desired speaker 202. While embodiments of this invention are indeed useful for indicating the directions of these other interfering audio signals (e.g. the user 204 and the fan 206), they are particularly useful for determining the directions of the major contributors to reverberance, such as the audio signal from the wall 208, because this interfering audio signal ($d_4$) would otherwise have been hard to identify (e.g. using the cross-covariance methods described above) due to the higher energy of the speech from the user 202 traversing the primary/direct path (d1) from the speaker 202 to the microphone array 106.

Figure 4:
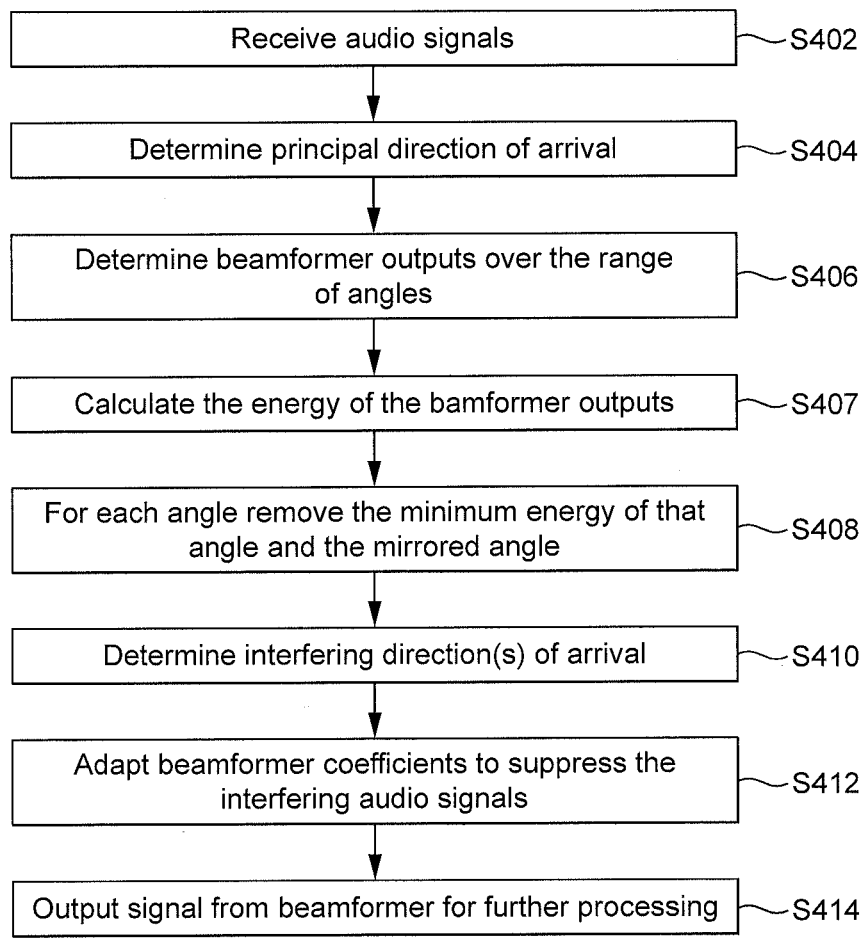
FIG. 4 is a flow chart for a process of processing audio signals according to a preferred embodiment.

With reference to FIG. 4 there is now described a method of processing audio signals according to a preferred embodiment. In step S402 audio signals are received at the microphones ($302_1$, $302_2$ and $302_3$) of the microphone array 106. The audio signals are received, for example, from the user 202, the user 204, the fan 206 and the wall 208 as shown in FIG. 2. Other interfering audio signals, such as background noise, may also be received at the microphones ($302_1$, $302_2$ and $302_3$) of the microphone array 106. The audio signals received by each microphone ($302_1$, $302_2$ and $302_3$) of the microphone array 106 are passed to the beamformer 304.

In step S404 the principal direction of arrival of the desired audio signals from the user 202 is determined. This is achieved by analyzing the audio signals to determine the angle in which the speech signals have the strongest correlation, as described in more detail below in relation to FIG. 7.

Figure 5A:
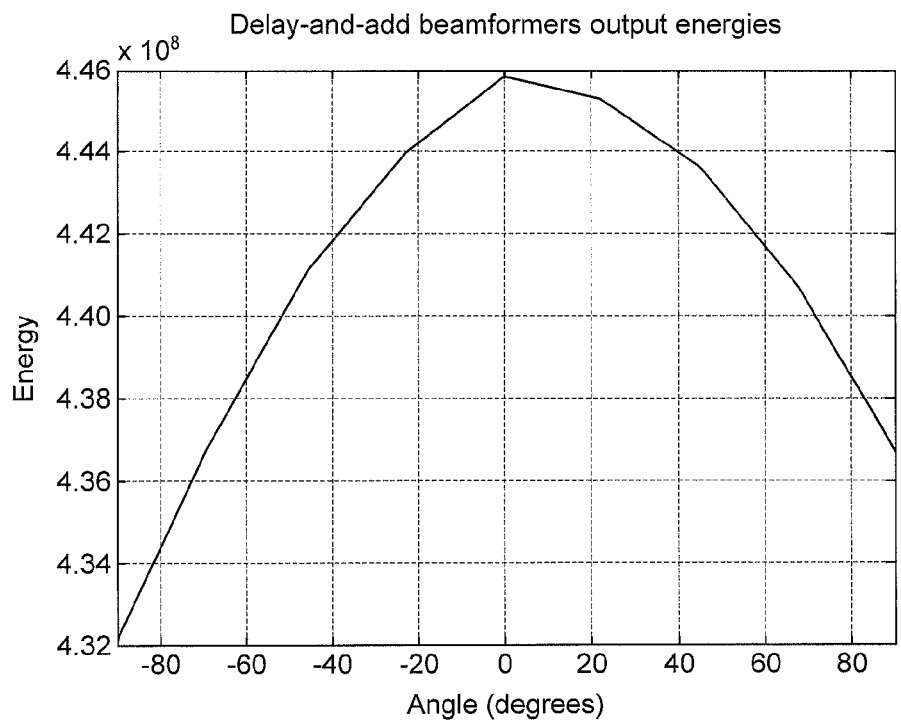
FIG. 5a is a first graph of a delay-and-add beamformer output energy as a function of direction of arrival.
Figure 6A:
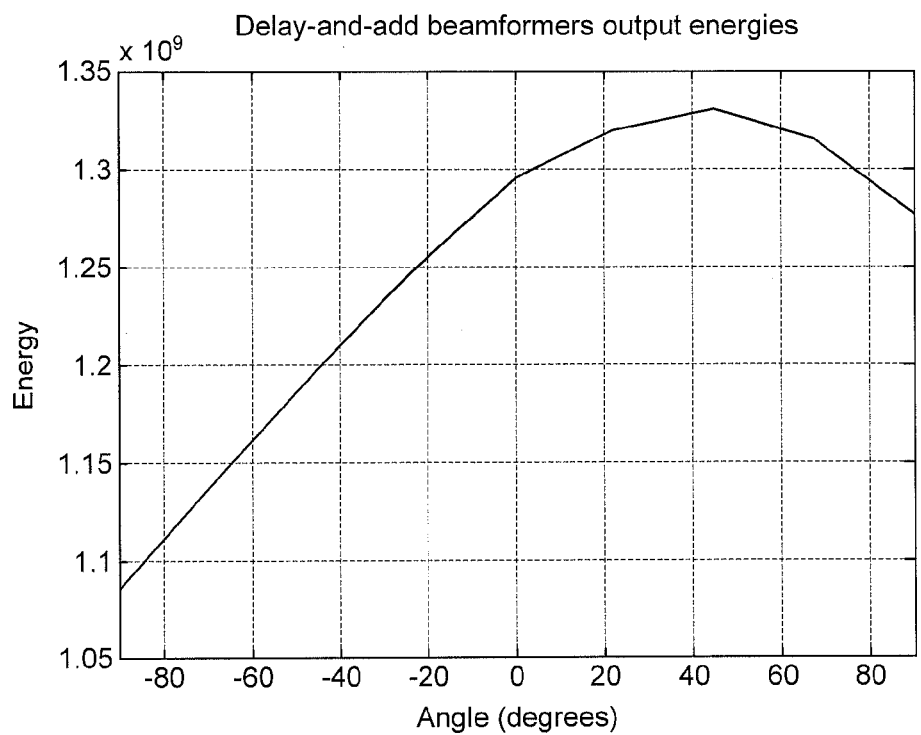
FIG. 6a is a third graph of a delay-and-add beamformer output energy as a function of direction of arrival.

In step S406 the processing means 306 determines the beamformer outputs from the beamformer 304 as the beamformer is steered over the range of angles. In this way the processing means 306 can extract spatial information from the received audio signals and can determine how the energy of the beamformer outputs vary with angle. Examples of graphs showing how the energy of the beamformer outputs vary as a function of angle are shown in FIGS. 5a and 6a and are described in more detail below. The processing means 306 can steer the beamformer 304 over the range of angles to thereby determine the beamformer outputs over the range of angles.

In step S407 the processing means 306 processes the beamformer outputs from the beamformer 304 such that for each angle over the range of angles, the energy is calculated of the output signal.

In step S408 the processing means 306 processes the beamformer outputs from the beamformer 304 such that for each angle over the range of angles, a value is removed from the beamformer output energy for that angle which is the minimum of: (i) the energy of the beamformer output for that angle, and (ii) the energy of a corresponding beamformer output for a corresponding angle mirrored around the principal direction of arrival. In some embodiments the energy that is removed is based on (but may, or may not, be equal to) the minimum of: (i) the energy of the beamformer output for that angle, and (ii) the energy of a corresponding beamformer output for a corresponding angle mirrored around the principal direction of arrival. For example the energy distributions may be smoothed over time. Alternatively, or additionally, the resulting energy distribution may be smoothed over time. All to reduce the detrimental effect of random fluctuations.

After removing the signal values in step S408 the remaining signal values of the range of beamformer outputs are indicative of the directions of arrival of the interfering audio signals from the sources of interference (204, 206 and 208). In step S410 the processing means 306 determines the interfering directions of arrival from the remaining signal values of the range of beamformer outputs.

FIGS. 5a to 6b provide experimental results of the effect of step S408 on the beamformer output energies. FIG. 5a shows a graph of a delay-and-add beamformer output energy as a function of direction of arrival when the desired speech signals are being received from the user 202 from the principal direction of arrival at 0 degrees. FIG. 5a is the result of determining the beamformer outputs over the range of angles from -90 degrees to 90 degrees which is performed in step S406. It can be seen in FIG. 5a that the audio signals are strongest at 0 degrees (i.e. at the principal direction of arrival) which indicates that the primary audio signal (the speech from the user 202) is dominating the received audio signals and that the interfering audio signals are received with a lower power at the microphone array 106 than the primary audio signal. However, it can be seen from FIG. 5a that the energy distribution of the received audio signals is not completely symmetrical around 0 degrees. The beamformer output has a higher energy when the beamformer 304 is steered to the right side (i.e. at positive angles in the graph) than when the beamformer 304 is steered to the left side (i.e. at negative angles in the graph)—that is the opposite side. For example, the beamformer output at 40 degrees has an energy just below $4.44 \times 10^8$ dB, whereas the beamformer output at −40 degrees has an energy just below $4.42 \times 10^8$ dB. This asymmetry is due to a greater level of interference being received from positive angles than from negative angles at the microphone array 106.

In use, the beamformer 304 can be steered so that the range of angles of the beamformer 304 has the principal direction of arrival at 0 degrees. Having the principal direction of arrival at 0 degrees the beamformer 304 generally provides a simpler beamforming process than if the beamformer 304 is arranged such that the principal direction is set away from 0 degrees. However, where there are more than one principal directions of arrival (i.e. more than one desired audio signal) then it may be the case that at least some of the principal directions of arrival are set away from 0 degrees of the beamformer 304 in the optimal arrangement. The coefficients of the beamformer 304 can be adapted to focus on audio signals received from more than one direction to thereby focus in the more than one principal directions of arrival.

Figure 5B:
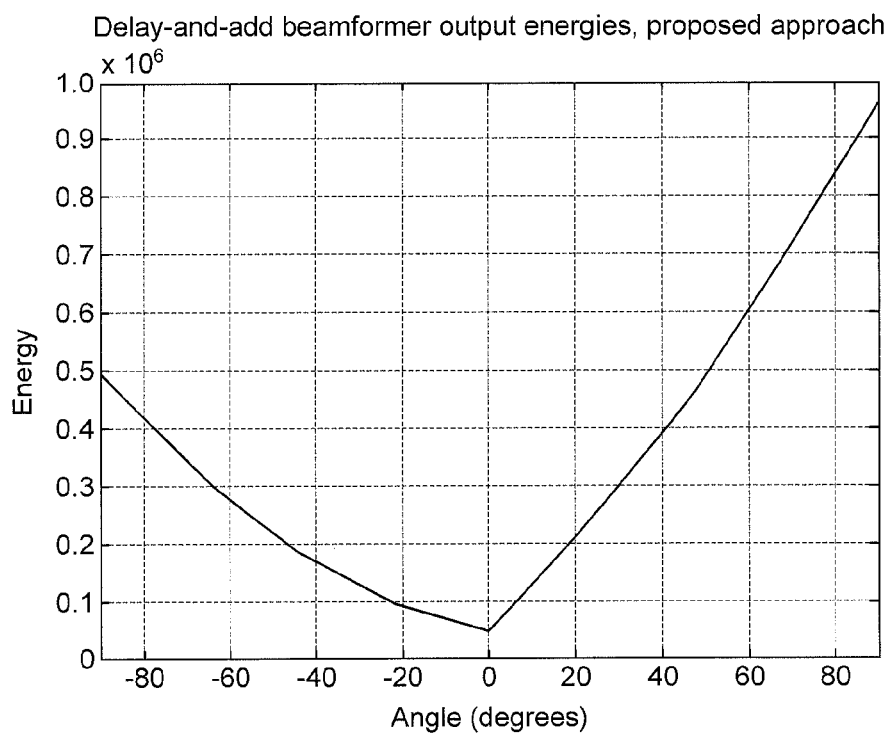
FIG. 5b is a second graph of a delay-and-add beamformer output energy as a function of direction of arrival after the symmetrical part has been removed.

FIG. 5b shows the result of step S408 in which the processing means 306 processes the beamformer outputs from the beamformer 304 shown in FIG. 5a such that for each angle over the range of angles, a value is removed from the beamformer output energy for that angle based on the minimum of: (i) the energy of the beamformer output for that angle, and (ii) the energy of a corresponding beamformer output for a corresponding angle mirrored around the principal direction of arrival. In an ideal scenario in which there were no interfering audio signals received at the microphone array 106 then the graph in FIG. 5b would be entirely flat at zero energy because all of the received audio signals would be symmetric around the principal direction of arrival and would therefore all be removed.

FIG. 5b clearly shows that a greater level of interference is arriving from the right hand side (i.e. from positive angles), and seems to be showing a maximum in the interference coming from an angle of 90 degrees. Theoretically, if the step S408 removed, at each angle, the exact energy of the minimum of: (i) the energy of the beamformer output for that angle, and (ii) the energy of a corresponding beamformer output for a corresponding angle mirrored around the principal direction of arrival, then you would expect the left hand side (i.e. negative angles) of FIG. 5b to be at a level of zero, and you would expect the right hand side (i.e. positive angles) of FIG. 5b to have some positive value, with a peak at an angle corresponding to the interfering direction(s) of arrival of the interfering audio signal(s). However, FIG. 5b shows real experimental results for which temporal smoothing of the beamformer output energies has been applied, and as a result the energy at negative values is not exactly equal to zero. However, FIG. 5b is indicative of the interfering direction(s) of arrival of the interfering audio signal(s), and seems to indicate that an interfering direction of arrival is at 90 degrees. Instead of detecting just one angle of interference, regularization noise may be scaled with the values shown in FIG. 5b. The level of suppression may be controlled based on the regularization noise, such that strong suppression is added to the entire right side, ensuring a significant suppression of the interfering source.

FIG. 6a shows a graph of a delay-and-add beamformer output energy as a function of direction of arrival when interfering speech signals are being received from the user 204 from an interfering direction of arrival at 45 degrees. FIG. 6a is the result of determining the beamformer output energies over the range of angles from −90 degrees to 90 degrees which is performed in step S406. It can be seen in FIG. 6a that the audio signals are strongest at 45 degrees (i.e. at the interfering direction of arrival) which indicates that the interfering audio signal (the speech from the user 204) is dominating the received audio signals. Therefore, the spatial distribution of the received audio signals shown in FIG. 6a is not symmetrical around 0 degrees.

Figure 6B:
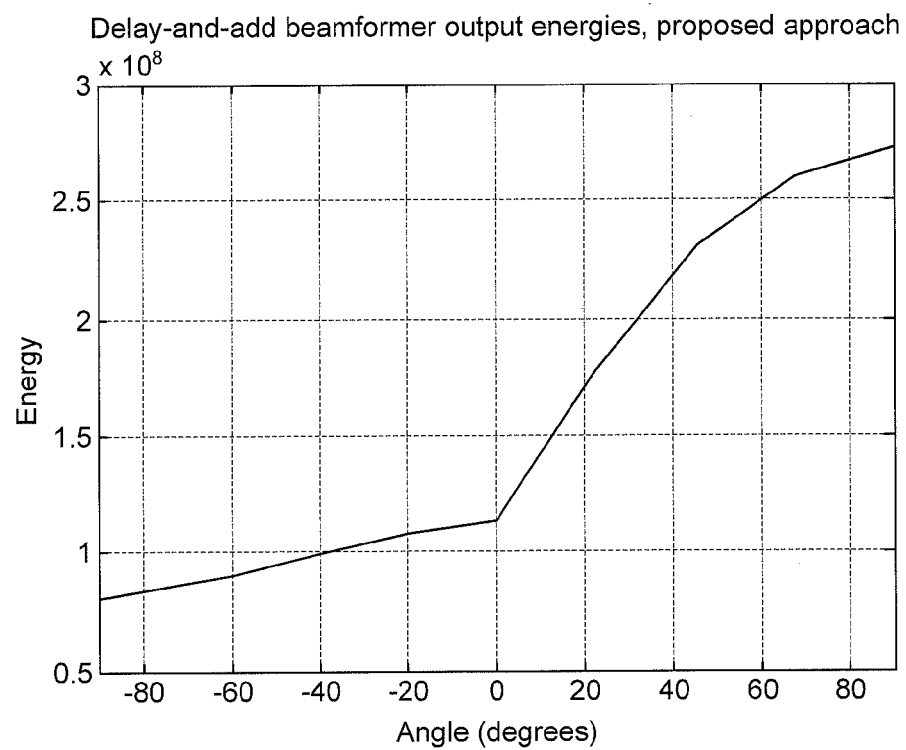
FIG. 6b is a fourth graph of a delay-and-add beamformer output energy as a function of direction of arrival after the symmetrical part has been removed.

FIG. 6b shows the result of step S408 in which the processing means 306 processes the beamformer outputs from the beamformer 304 shown in FIG. 6a such that for each angle over the range of angles, a value is removed from the beamformer output energy for that angle based on the minimum of: (i) the energy of the beamformer output for that angle, and (ii) the energy of a corresponding beamformer output for a corresponding angle mirrored around the principal direction of arrival. FIG. 6b shows real experimental results for which smoothing of the beamformer outputs has been applied. The beamformer output energy shown in FIG. 6b keeps rising as the angle increases beyond 45 degrees. This is due to the number of microphones being so low that the main lobe of the beamformers with an angle next to the one of the interference contains a significant contribution from the interfering source. With a low number of microphones this suboptimality makes little difference as we are mostly only able to suppress one side or the other, and for a higher number of microphones in the array, the main lobe would be more narrow, and would therefore cause less smearing of the interference in the output energies.

FIG. 6b clearly shows that a greater level of interference is arriving from the right hand side (i.e. from positive angles), and is indicative of the interfering direction(s) of arrival of the interfering audio signal(s).

Returning to FIG. 4, once the interfering directions of arrival of the interfering audio signals have been determined in step S410 as described above then in step S412 the processing means 306 adapts the beamformer 304 to suppress the interfering audio signals received from the determined interfering directions of arrival. In this sense, the processing means 306 adapts the beamformer coefficients which are applied to the received audio signals by the beamformer 304. The beamformer coefficients describe the attenuation, as a function of angle of receipt of the audio signals at the microphone array 106, which is to be applied to the audio signals by the beamformer 304. The beamformer coefficients are adapted such that a greater level of suppression is applied to audio signals received at the microphone array 106 from the determined interfering directions of arrival.

In step S414 the beamformer outputs the processed audio signal for further processing in the device 102. The adaptation of the beamformer coefficients in step S412 improves the quality of the primary audio signal in the beamformer output by reducing the interference in the beamformer output.

In one example, the beamformer 304 is a Minimum Variance Distortionless Response (MVDR) beamformer which minimizes the energy of the output of the beamformer 304 under the constraints of not distorting the primary audio signal(s) received at the microphone array 106 with the principal direction(s) of arrival.

The operation of direction of arrival (DOA) estimation performed by the beamformer 304 and/or the processing means 306 to determine the principal direction of arrival of the speech signal from the user 202 will now be described in more detail with reference to FIG. 7.

The DOA information is estimated by the DOA estimation block 303 by means of estimating the time delay, e.g. using correlation methods, between received audio signals at the plurality of microphones of the microphone array 106, and estimating the source of the audio signal using the a priori knowledge about the location of the plurality of microphones $302_1$, $302_2$ and $302_3$ of the microphone array 106.

Figure 7:
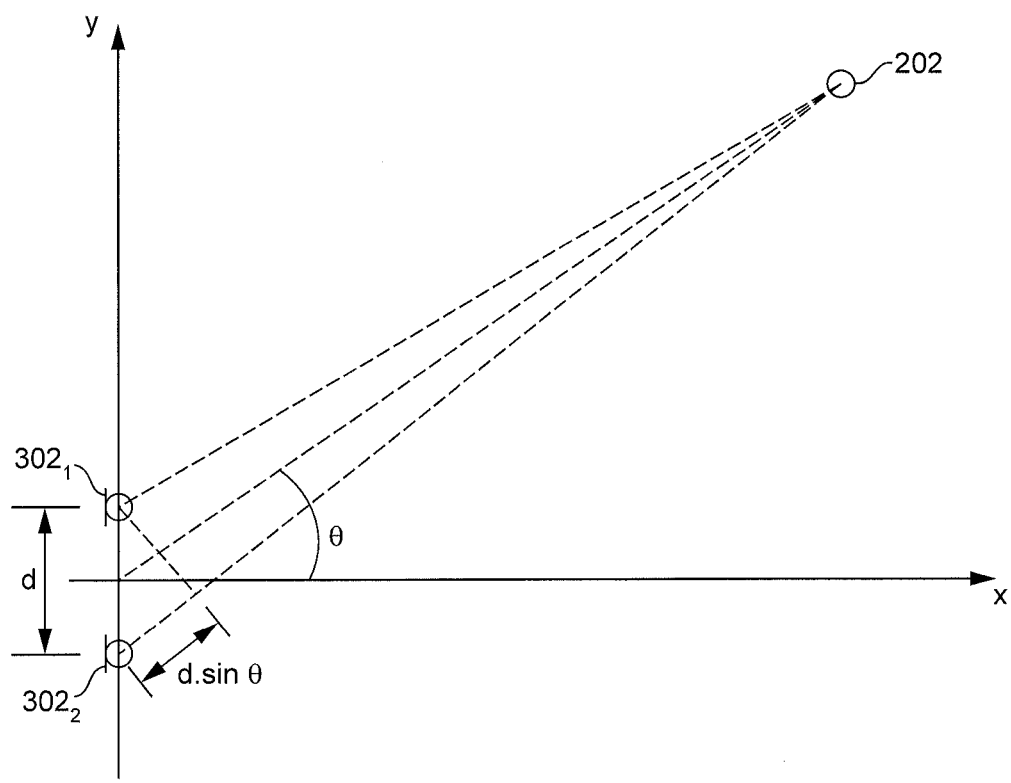
FIG. 7 shows a diagram representing how Direction of Arrival information is estimated in one embodiment.

As an example, FIG. 7 shows microphones $302_1$ and $302_2$ of the microphone array 106 receiving audio signals on two separate input channels from the primary audio source 202. For ease of understanding FIG. 5 shows a point source 202 where waves are propagating in a circular motion away from the source 202. This is how it is in real-life, but the equation shown below assumes that the received audio signals are received at the microphones $302_1$ and $302_2$ as plane waves. This assumption is a good assumption when the point source 202 is 'far enough' away from the microphones $302_1$ and $302_2$. The direction of arrival of the audio signals at microphones $302_1$ and $302_2$ separated by a distance, d, can be estimated under a plane wave assumption using equation (1):

$$\theta = \arcsin\left(\frac{\tau_D v}{d}\right) \quad (1)$$

where $v$ is the speed of sound, and $\tau_D$ is the difference between the times that the audio signals from the primary source 202 arrive at the microphones $302_1$ and $302_2$—that is, the time delay. The distance, d, is a known parameter for the microphone array 106 and the speed of sound, $v$, is known (approximately 340 m/s). The time delay, $\tau_D$, is obtained as the time lag that maximizes the cross-correlation between the received primary audio signals at the outputs of the microphones $302_1$ and $302_2$. The angle, $\theta$, may then be found which corresponds to this time delay using equation (1) given above. Speech characteristics can be detected in audio signals received with the delay of maximum cross-correlation to determine one or more principal direction(s) of a main speaker(s).

It will be appreciated that calculating a cross-correlation of signals is a common technique in the art of signal processing and will not be describe in more detail herein.

In a preferred embodiment, the determination of the interfering directions of arrival, according to the method described above, is active whenever the desired speech signal from the user 202 having the principal direction of arrival is dominating the input signal, that is, whenever the maximum energy before subtracting anything from the range of beamformer outputs is from the delay-and-add beamformer output at 0 degrees. It is in these conditions that the method is particularly useful, e.g. for determining the direction of arrival for reverberance of the speech signal. As described above, a particular advantage of embodiments of the present invention over the prior art is the clear identification of the directions of arrival for interfering sources, with the identification of the directions of the desired speaker's acoustic reflections being its particular strength.

In the embodiments described above the DOA estimation block 303 and the processing means 306 are shown as separate elements to the beamformer 304, but in alternative embodiments the DOA estimation block 303, the processing means 306 and the beamformer 304 could be implemented as a single unit within the device 102.

The steps S404 to S412 may be performed periodically to ensure that the coefficients of the beamformer 304 is adapted to correctly suppress the interfering audio signals currently being received at the microphone array 106. Although in the embodiments described above and as shown in FIG. 3 only one beamformer 304 is used, in other embodiments two or more beamformers may be used. In one example, a primary beamformer (e.g. a Minimum Variance Distortionless Response (MVDR) beamformer) could be used to process the received audio signals to provide an output for further processing in the device 102, whereas a secondary beamformer (e.g. a delay-and-add beamformer) could be used in steps S406 to S410 for determining the interfering direction(s) of the interfering audio signals. In this example, the processing means 306 would receive the beamformer outputs from the secondary beamformer as it is steered over the range of angles and would use these beamformer outputs to determine the interfering angles of arrival (in steps S408 and S410), but then the processing means 306 would adapt the coefficients of the primary beamformer (in step S412) such that the correct beamformer coefficients are applied to the received audio signals of the beamformer to suppress the interfering audio signals before passing the beamformer output of the primary beamformer for further processing in the device 102.

As described above, the DOA estimation block 303, the beamformer 304 and processing means 306 may be implemented in software executed on the CPU 104 or implemented in hardware in the device 102. When the DOA estimation block 303, beamformer 304 and processing means 306 are implemented in software, they may be provided by way of a computer program product embodied on a non-transient computer-readable medium which is configured so as when executed on the CPU 104 of the device 102 to perform the functions of the DOA estimation block 303, beamformer 304 and processing means 306 as described above.

Whilst the embodiments described above have referred to a microphone array 106 receiving one desired audio signal ($d_1$) from a single user 202, it will be understood that the microphone array 106 may receive audio signals from a plurality of users, for example in a conference call which may all be treated as desired audio signals. In this scenario multiple sources of wanted audio signals arrive at the microphone array 106.

Whilst the embodiments described above have referred to the use of beamformer outputs, other measurements may be used which indicate the energy of the received signals for each particular angle. The spatial asymmetries in any suitable measurement will indicate the direction(s) of arrival of interfering signals because the primary signals will be seen symmetrically in the measurements. The beamformer outputs described above are just one example of a suitable correlation measurement. Other examples of useful measures are cross-correlation coefficients, cross-covariance coefficients, coherence, and cross-correlation and any measure based on any one of more of these.

Furthermore, while this invention has been particularly shown and described with reference to preferred embodiments, it will be understood to those skilled in the art that various changes in form and detail may be made without departing from the scope of the invention as defined by the appendant claims.

What is claimed is:

1. A method of processing signals at a device, the method comprising:
   receiving signals, over a range of angles, at an input of the device, the signals including a primary signal received with a principal direction of arrival at the input and at least one interfering signal received with a respective at least one interfering direction of arrival at the input;
   determining a plurality of measurements for the received signals over the range of angles, each measurement relating to a particular angle and indicating the energy of the received signals which are received from the particular angle; and
   for each angle over the range of angles, removing from the measurement for that angle a value based on the minimum of: (i) the measurement for that angle, and (ii) a corresponding measurement for a corresponding angle mirrored around the principal direction of arrival, whereby the remaining values of the plurality of measurements are indicative of said at least one interfering direction of arrival.

2. The method of claim 1 further comprising suppressing the signals received with the at least one interfering direction of arrival as indicated by said remaining values of the measurements.

3. The method of claim 1 further comprising determining the principal direction of arrival by analyzing the received signals.

4. The method of claim 1 further comprising setting the range of angles such that the principal direction of arrival is in the middle of the range of angles.

5. The method of claim 1 wherein the step of determining a plurality of measurements comprises determining a range of beamformer outputs of beamforming means applied to the received signals when steered over the range of angles, and
   wherein the step of removing a value from the measurement for each angle over the range of angles comprises removing from the beamformer output energy for that angle a value based on the minimum of: (i) the energy of the beamformer output for that angle, and (ii) the energy of a corresponding beamformer output for a corresponding angle mirrored around the principal direction of arrival, whereby the remaining values of the plurality of beamformer outputs are indicative of said at least one interfering direction of arrival.

6. The method of claim 1 wherein the measurements are correlation measurements which indicate the correlation of the received signals as a function of the angle at which the signals are received.

7. The method of claim 1 wherein the input comprises a plurality of sensors for receiving the signals, and the method further comprises using a primary beamformer to apply beamformer coefficients to the received signals thereby applying greater levels of suppression to signals received with the at least one interfering direction of arrival than to signals received with the principal direction of arrival.

8. The method of claim 1 wherein said removing step is performed in dependence upon a determination that the primary signal has the highest power of the received signals.

9. The method of claim 1 wherein the signals are one of: (i) audio signals, (ii) general broadband signals, (iii) general narrowband signals, (iv) radar signals, (v) sonar signals, (vi) antenna signals, (vii) radio waves and (viii) microwaves.

10. A device for processing signals, the device comprising:
    an input for receiving signals over a range of angles, the signals including a primary signal received with a principal direction of arrival at the input and at least one interfering signal received with a respective at least one interfering direction of arrival at the input;
    means for determining a plurality of measurements for the received signals over the range of angles, each measurement relating to a particular angle and indicating the energy of the received signals which are received from the particular angle; and
    means for removing, for each angle over the range of angles, from the measurement for that angle a value based on the minimum of: (i) the measurement for that angle, and (ii) a corresponding measurement for a corresponding angle mirrored around the principal direction of arrival, whereby the remaining values of the plurality of measurements are indicative of said at least one interfering direction of arrival.

11. The device of claim 10 further comprising means for suppressing the signals received with the at least one interfering direction of arrival as indicated by said remaining values of the plurality of measurements.

12. The device of claim 10 further comprising means for determining the principal direction of arrival by analyzing the received signals.

13. The device of claim 10 wherein the range of angles is set such that the principal direction of arrival is in the middle of the range of angles.

14. The device of claim 10 wherein the means for determining comprises beamforming means arranged to be applied to the received signals and to output a plurality of beamformer outputs when steered over the range of angles, and wherein the means for removing comprises means for removing, for each angle over the range of angles, from the beamformer output energy for that angle a value based on the minimum of: (i) the energy of the beamformer output for that angle, and (ii) the energy of a corresponding beamformer output for a corresponding angle mirrored around the principal direction of arrival, whereby the remaining values of the plurality of beamformer outputs are indicative of said at least one interfering direction of arrival.

15. The device of claim 14 wherein the beamforming means comprises a delay-and-add beamformer.

16. The device of claim 10 wherein the measurements are correlation measurements which indicate the correlation of the received signals as a function of the angle at which the signals are received, and wherein the determining means comprises correlation measurement means for determining said correlation measurements.

17. The device of claim 10 wherein the input comprises a plurality of sensors for receiving the signals, and wherein the device comprises a primary beamformer for applying beamformer coefficients to the received signals to thereby apply greater levels of suppression to signals received with the at least one interfering direction of arrival than to signals received with the principal direction of arrival.

18. The device of claim 17 wherein the primary beamformer comprises a Minimum Variance Distortionless Response beamformer.

19. The device of claim 10 wherein the device is a television or a computer.

20. The device of claim 10 wherein the signals are audio signals and the input means comprise a plurality of microphones for receiving the audio signals.

21. A computer program product for processing signals received over a range of angles, at an input of a device, the signals including a primary signal received with a principal direction of arrival at the input and at least one interfering signal received with a respective at least one interfering direction of arrival at the input, the computer program product being embodied on a non-transient computer-readable medium and configured so as when executed on a processor of the device to perform the steps of:

determining a plurality of measurements for the received signals over the range of angles, each measurement relating to a particular angle and indicating the energy of the received signals which are received from the particular angle; and for each angle over the range of angles, removing from the measurement for that angle a value based on the minimum of: (i) the measurement for that angle, and (ii) a corresponding measurement for a corresponding angle mirrored around the principal direction of arrival, whereby the remaining values of the plurality of measurements are indicative of said at least one interfering direction of arrival.

22. A device configured to process signals, the device comprising:

an input block configured to receive signals over a range of angles, the signals including a primary signal received with a principal direction of arrival at the input block and at least one interfering signal received with a respective at least one interfering direction of arrival at the input block;

a determining block configured to determine a plurality of measurements for the received signals over the range of angles, each measurement relating to a particular angle and indicating the energy of the received signals which are received from the particular angle; and a removing block configured to remove, for each angle over the range of angles, from the measurement for that angle a value based on the minimum of: (i) the measurement for that angle, and (ii) a corresponding measurement for a corresponding angle mirrored around the principal direction of arrival, whereby the remaining values of the plurality of measurements are indicative of said at least one interfering direction of arrival.

* * * * *